Fig. 1.

INVENTOR.
Frank David Butler

FIG_2_

Patented Aug. 24, 1954

2,687,048

UNITED STATES PATENT OFFICE 2,687,048

INTERNAL FLUID PRESSURE VARIABLE COMBINED HYDRODYNAMICAL AND PLANETARY GEARING DRIVEN TRANSMISSION COUPLER APPLICABLE TO A TRACTION WHEEL OF AN AUTOMOTIVE VEHICLE

Frank David Butler, Venice, Calif.

Application September 8, 1952, Serial No. 308,466

21 Claims. (Cl. 74—655)

My invention relates in general to combined hydrodynamical and planetary gearing driven types of variable, reversible sun-gear types of transmission couplers and is for use wherever applicable and particularly for use in forming the hub, tire-rim and brake drum means of a combined traction wheel and power transmission assembly of an automotive vehicle.

In my present invention I provide a combined type of dual hydrodynamic and planetary gearing driven internal fluid pressure variable transmission coupler which forms the hub, tire-rim and brake drum, of the traction wheel assembly with which it is combined in an automotive vehicle. Within such a wheel in such type of vehicle, this coupler provides a means of semi-automatically and manually controlling the speed ratio changes required, in both forward and reverse motion rotation of the coupler sun-gear, to accommodate the torque load applied on such traction wheel in relation to and between the rotative speeds of the latter and that of a reversible driving shaft means with which said sun-gear rotates.

This coupler consists substantially of; a sun-gear coaxially rotatable in either direction of rotation with a stator supported shaft forming the driving member, a coaxially rotatable, annular shaped, combined orbit-gear carrier and multi-bucketed closed fluid receptacle casing forming a hydrodynamical and gearing driven member, and, a coaxially rotatable, annular shaped, multi-vaned combined planet-gear carrier and fluid circulating inpeller forming the intermediate and also the hydrodynamical driving member of said coupler; a variable fluid pressure means, applicable to within said closed casing, by and through which a pair of oppositely located, annular shaped, flanged brake-shoes, rotatable coaxially with and driven by said intermediate member, are simultaneously variably axially displaced against adjacent parallel braking surfaces rotatable with said driven member, and thus forms a variable dual clutching means, between said intermediate and driven members, that is in parallel with the dual progressive hydrodynamical locking-means existing between such two members, and whereby the latter locking-means can be varied at will by varying the pressure on said clutching means; a multiple spring means for providing each of said brake-shoes with an initial axial thrust against said driven member; means of forming dual circulation of fluid within said coupler by said dual-vaned intermediate member and said dual-bucketed driven member of said coupler; and, means of applying this coupler as forming the hub proper of a traction wheel of an automotive vehicle.

In such type of combined assembly, the results obtainable therein depends upon; the torque load applied thereto in relation to the speed of rotation of the drive sun-gear of such coupler; the relative speeds of rotation of said two gear carriers one to the other; the relative rotative force generated by the dual flow fluid circulating impeller as compared with the force generated by the planetary gearing element of such coupler, also wherein the viscosity of the fluid used within such coupler is a major factor; and, wherein the application of the variable hydraulic fluid to within the coupler as a booster means, for dual clutching said gear carriers together in parallel with said dual hydrodynamic locking-means, is the means for controlling the operation of such a combined coupler assembly.

While the gearing ratio between the drive sun-gear and the driven orbit-gear of the coupler is a matter of choice, the example illustrations herein are of a 4 to 1 ratio wherein, with the planet-gear carrier stopped, it would require four clockwise revolutions of said driving sun-gear to rotate said orbit gear one revolution in reverse anti-clockwise. Otherwise, as with said ring-gear stopped, it would require five clockwise revolutions of said sun-gear to rotate said planet-gear carrier one clockwise revolution about said such sun-gear, and which change, from said 4 to 1 normal ratio, is due to the fact that said planet-gear carrier carries such planet-gears through 360° of arc as it revolves idly around said sun-gear during such operation, and during which period, each individual planet-gear rotates anti-clockwise 960° on its own axis.

Thus during one complete clockwise revolution of said driving sun-gear, with said orbit-gear stopped, said planet-gear carrier would rotate idly clockwise around said sun-gear ⅕ of 360° or through 72° of arc while carrying the planet gears with it, and during which period, each individual planet-gear would rotate, on its own axis anti-clockwise, (360° minus 72°) × ⅔ and/or 192°, and wherein the ⅔ is the relation between the number of teeth in said sun-gear and the number of teeth in each individual planet-gear. Following such a rotative operation, and with said sun-gear stopped, if said orbit-gear is then rotated clockwise one revolution, it will carry the planet-gear carrier with it ⅘ of 360° or through 288° of arc, and during which period, each of said planet-gears would rotate, on its own axis clockwise, (360° minus 288°) ×2⅔ or 192°, and wherein the 2⅔ is the relation between the number of teeth in said orbit-gear and the number of teeth in each planet-gear, and all rotative parts of such coupler would be at their starting points or in a 1 to 1 ratio between said driving sun-gear and said driven orbit-gear, and the last mentioned operation illustrates how the gearing ratio of the coupler is automatically increased as said orbit-gear carrier starts rotating and carrying said planet-gear carrier.

Other important objects of this invention include the provision of: a symmetrically constructed halved type of, axial pressure balanced, combined dual fluid flow circulating impeller and planet-gear carrier; a driving sun-gear integral with a pair of oppositely tapering tandem cone journals for roller bearings of said planet-gear carrier and said orbit-gear carrier; a halved type of combined orbit-gear carrier and enclosed fluid receptacle casing forming the driven member of such coupler and provided with a pair of rows of buckets for receiving said dual flow of fluid circulation; means for sealing said enclosed casing fluid pressure tight; means for rotatively driving said pair of brake-shoes by said planet-gear carrier; means providing each of said pair of clutch shoes with an initial axial thrust away from said planet-gear carrier and toward side walls, forming a part of and, located internal to said enclosed casing; means for rotatively driving the shaft of such coupler from and by a shaft of a motive power means; a reciprocative, variable stroke, plunger pump means for supplying fluid under a variable pressure from a remote location internally to said coupler for axially displacing said pair of clutch shoes within said enclosed casing and for substantially clutching said planet-gear carrier against said orbit-gear carrier; and, means for mounting said coupler in combination with a traction wheel assembly of an automotive means within the framing of the latter in an adjustable and flexible manner.

With reference to the accompanying drawings forming a part hereof; Fig. 3 is a diagrammatic sketch, jointly in section and side elevation, illustrating a typical installation of the combined coupler and traction wheel assembly as applicable within an automotive scooter; Fig. 4 is a diagrammatic sketch illustrating the rotative elements of the coupler and traction wheel assembly at rest and in the positions they occupy in Figs. 1 and 2; and, Figs. 5 to 11 inclusive, diagrammatically illustrate different conditions that can exist within the coupler under various operating and other conditions.

Figures 3, 4, 5, 6, 7, 8, 9, 10, 11:
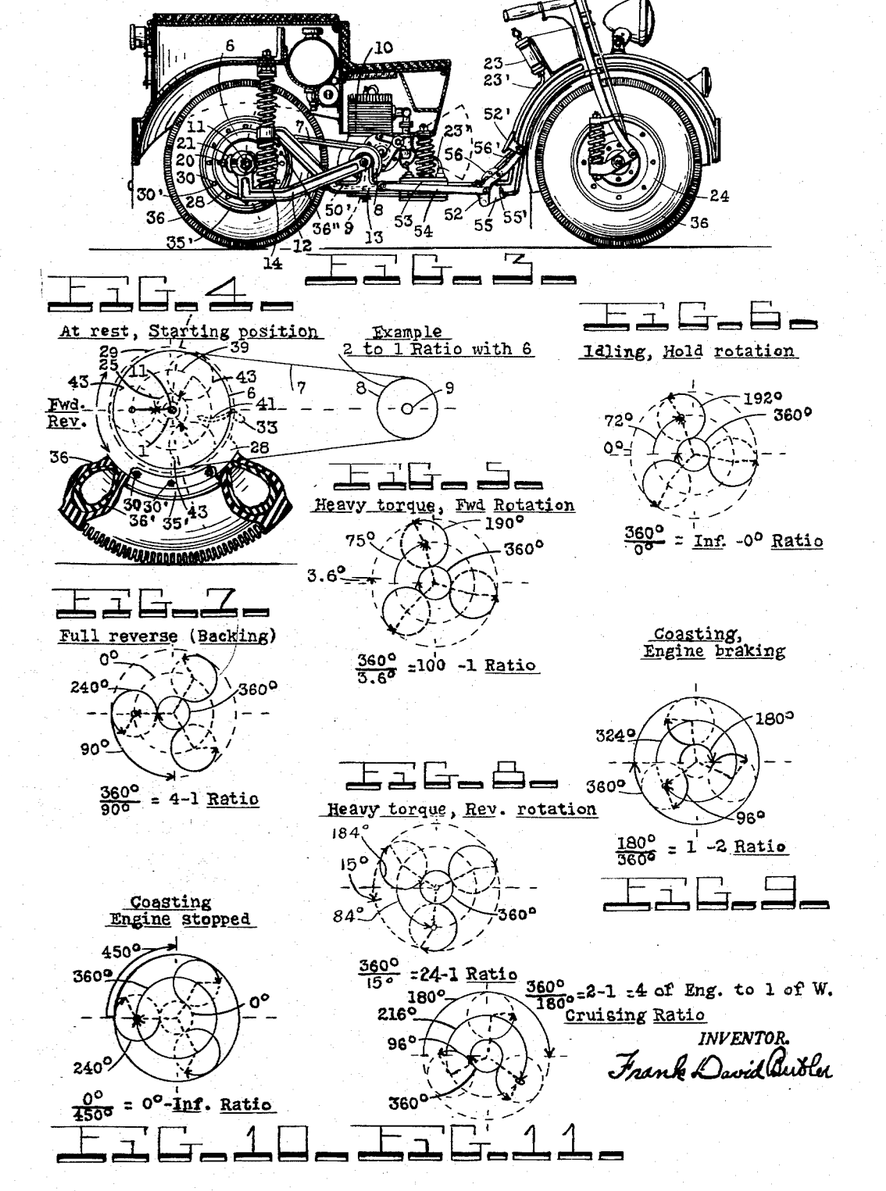

In Fig. 7 of the last mentioned diagrammatical figures is illustrated how the orbit gear would be reversed 90° if the planet-gear carrier was stopped while the sun-gear was rotating forward through 360° of rotation.

Inasmuch as the coupler, illustrated herein as applicable to a motor-cycle, would not be required to be reversible, then the sun-gear of such coupler would always rotate in a forward direction. However, if such coupler is to be made reversible, in its present state, then the axle shaft supporting and rotating the sun-gear of the coupler should be reversible; then the rotations and conditions of operations within the coupler would be similar to those illustrated in Figs. 5, 6 and 11, but would be in an opposite direction of rotation thereto, similar to Fig. 8.

With reference to the drawings and the symbols thereof, similar symbols therein represent and indicate similar parts in the several views and diagrammatic sketches, the numeral 1 indicating the elongated tubular shaped assembled type of rotatable shaft of the coupler and which is threaded at one end thereof to receive an enlarged annular shaped hub portion 1' located opposite to a similar but flanged hub portion 1" which latter is integral with and forms a V-shaped pulley 6, while the intermediate portion of said shaft 1, between said hubs 1' and 1", is tapering and is provided at one end thereof with a half-moon key 2 for driving the sun-gear. Within each hub portion 1' and 1" a tapering roller bearing 3 and a tandem pair of fluid wiper seal assemblies 4 are provided and the latter, though each a press-fit within the bore of its respective hub portion, are retained in place by a spring type of retainer ring 5 one in each such hub portion. The V-shaped pulley 6 may be welded to the hub portion 1' and thus forms a means of driving said coupler shaft 1 through a V-shaped belt 7 from a V-shaped drive pulley 8 which latter is rotatable with the shaft 9, of the motive power means, and is preferably ½ the diameter of said pulley 6.

This particular type of coupler is unique in the fact that the tubular coupler shaft 1 thereof is provided to be rotatably mounted upon a non-rotatable stator axle 11 that is adjustably mounted within a pair of parallel extending sub-frames 12 which latter are pivotally supported in the main frame 13 at points in line with the axis of the shaft 9 of the motive power means 10, and wherein a pair of elongated resilient coil type of springs 14 are interposed between and secured at opposite ends to said parallel frames 12 and said main frame 13 and thus making said coupler flexibly supported in respect to the main frame 13. The parallel frames 12 are both forked shaped opposite to their pivoted ends and are provided to slidably receive the opposite ends of said axle 11 which latter is provided with an enlarged rectangular boss 11', adjacent one end thereof, that prevents it from rotating within said forked end of said sub-frame 12 and forms part of an enlarged disc flange 11" to which latter the brake-drum dust cover 15 is welded and thus forms an integral part of said axle 11.

A pair of cone-journals 16 and 16' are provided for said pair of roller bearings 3 of said shaft 1 and form cylindrical bearing surfaces for said pair of dual wiper assemblies 4, and wherein the journal 16 is a press-fit over and is shouldered against one end of said axle 11, while the other journal 16' is a threaded fit over and forms an adjustment means adjacent the other end of said axle 11. Both extreme ends of such axle 11 are threaded and are each provided with relatively large diameter flat washers 17 and locking washers 18 for purposes of rigidly securing said axle 11 within and between said forked ends of sub-frames 12 by and with the pair of nuts 19, and wherein said axle is slidably adjustable within said forked ends by the draw-bolts 20 and 20' which latter are each provided with a lug 21 and the usual locking washers and nuts for adjustment purposes. The draw-bolt 20 is eye-shaped and fits over one end of axle 11, while the draw-bolt 20' is taper threaded into said boss 11' and is provided with an access hole extending there-through, and a tubing connection fitting 22 is provided opposite to such taper thread of said draw-bolt 20' through which to pass fluid under a variable pressure to within said coupler via suitable access holes within said axle 11.

A remotely located, variable stroke, manually operatable plunger type of pump 23 is provided and is connected to said fitting 22 via tubing 23' for the purpose of containing fluid and forming a means whereby the pressure upon the fluid within the coupler casing can be varied at the will of the operator of the automotive conveyance means, and such pump 23 could be located, for convenience, in the vicinity of the front wheel 24 framing as in Fig. 3.

Within the traction wheel hub and the coupler proper, a driving sun-gear 25, that may be reversed in rotation, is provided and is integral with a pair of oppositely tapering twin tandem journal cones 26, with one tandem cone located on either side of the gear teeth proper of said sun-gear and forming tapering journals for roller bearings, and wherein such combined sun-gear and cone journals is in the form of a single unit provided with a tapering bore having a press-keyed-fit with said tapering portion of said tubular shaft 1, and wherein such unit is locked between the hubs 1 and 1' by the latter which is itself locked in place by the plurality of socket type of set-screws 27.

The coupler casing 28 is annular in shape and is of the split type having two halves 28' and 28'' which halves are secured together, with a relatively large diameter, internally toothed, annular shaped orbit gear 29 therebetween, by and with a series of collared stud-bolts 30, and are provided with a plurality of relatively thin adjustment shims 31 located either side of and between said orbit gear 29 and the adjacent halves of said casing 28. The latter is provided to be rotatably mounted upon a pair of oppositely tapering roller bearings 32, with one of the latter located in the hub portion of each casing half 28' and 28'' thereof, and wherein said bearings are each journalled on oppositely located cone journals 26 integral with said driving sun-gear 25. Within each of said hub portions of the casing halves 28' and 28'', adjacent to the roller bearing 32 in the latter, is provided a pair of garter-spring-loaded fluid seal wiper assemblies 4', similar to assemblies 4, each having a packing ring bearing against the cylindrical portion of the adjacent shaft hub 1' and 1'' of shaft 1 and provided for maintaining the casing 28 fluid pressure tight, and wherein each assembly 4' is retained in place by the adjacent spring snap-ring 5'.

Figure 2:
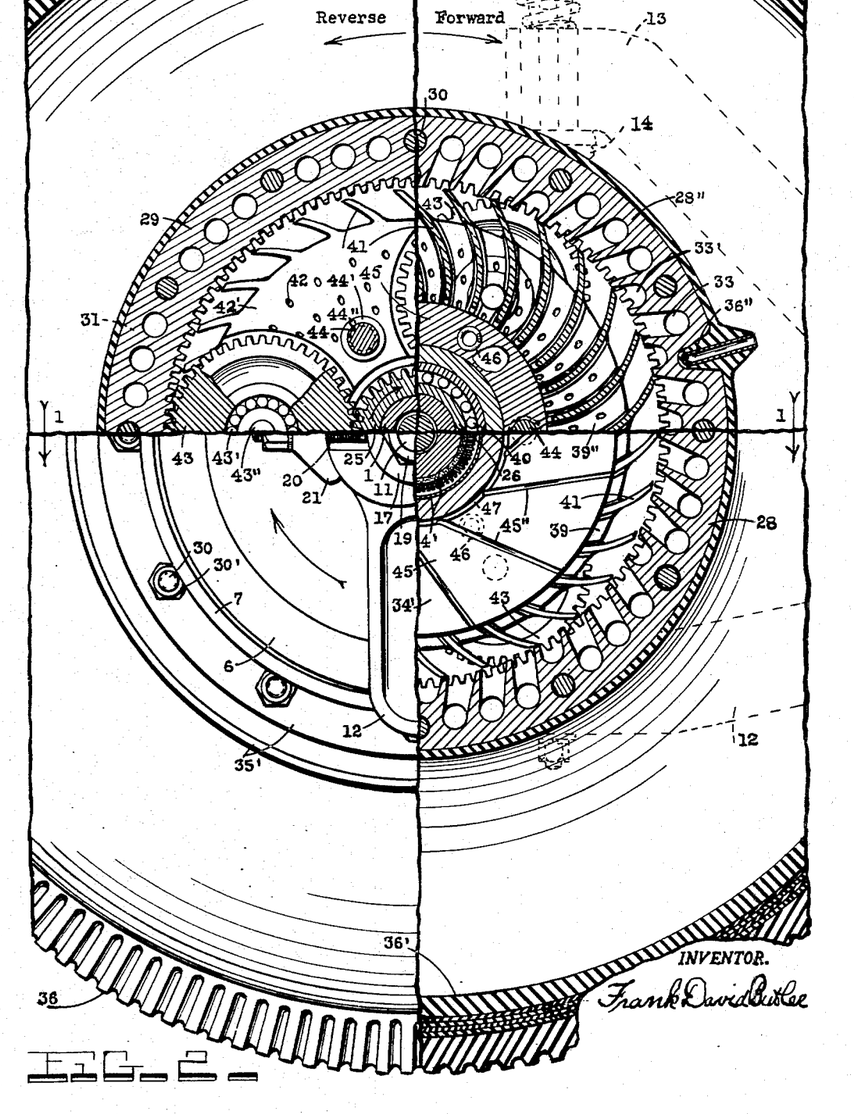
Fig. 2 is a view of Fig. 1 jointly in side elevation and in a plurality of transverse broken away sections, with the lower left quarter of Fig. 2 in side elevation, with the upper left quarter as it would appear on the dotted and broken line 2—2 of Fig. 1, with the upper right quarter as it would appear on the dotted and broken line 2'—2' of Fig. 1, and with the lower right quarter as it would appear on the dotted and broken line 2"—2" of Fig. 1.

Each of said casing halves 28' and 28'' of casing 28 consists of; a row of integrally formed, symmetrically arranged, elongated semi-cylindrically shaped buckets 33 and 33' which are located in and extend parallel to the rim thereof such casing half, from adjacent to the side of said orbit-gear 29 to adjacent to the interior side wall of such casing half, and are provided to be open along their inner radius sides; a cylindrical hub portion containing one of said roller bearings 32 and a pair of said wiper assemblies, and which hub forms a journal on its outer circumference surface; and, an annular shaped bossed thrust face 34 forming a part of said casing side wall and extending parallel with the latter. The casing half 28' is provided with a series of tap-threaded holes adaptable to receive the ends of said series of collared stud-bolts 30, while the casing half 28'' is provided with a series of counter-sunk holes adaptable to receive the collared portions of said stud-bolts 30. The casing half 28' is further provided to be integral with the traction wheel rim 35, upon which latter is mounted the tire-casing 36 and inner tube 36' of the traction wheel, and also integral with the air-cooled brake drum 37, and to be equipped with a pair of similar, but oppositely located, fluid drain and air vent plugs 38 and 38' respectively which are both tap-threaded through the flange of said wheel-rim 35 and each have access to one of said buckets 33, while the casing half 28'' is provided with an access recess for the inner tube 36' inflation valve fitting 36'' Fig. 2, and also has the demountable tire-rim 35' flange secured, against its outer corner rim edge, by and with the series of conically shaped nuts 30' threaded over the outer ends of said series of stud-bolts 30.

As should be noted, either or both the inner tube 36' and tire-casing 36 may be removed from the extremity of the casing 28, without in any manner dismantling the latter, by simply removing the series of nuts 30' and the demountable rim 35' which secure tire 36 upon the coupler casing 28.

Astride of the journals 26, forming part of sun-gear 25 and of said orbit gear 29, within said coupler casing 28, is located and provided the annular shaped, split type, of assembled combined dual flow fluid circulating impeller and planet-gear carrier 39, having two halves 39' and 39'', and which is rotatably mounted upon a pair of oppositely tapering roller bearings 40, and wherein one of the latter is located within the hub portion of each half 39' and 39'' of assembly 39 and is provided to be journalled with one bearing 40 on one of said cone journals 26, and the other bearing 40 on the opposite of said cone journals, which journals are integral on either side of and with said driving sun-gear 25. Each half 39' and 39'' of the assembly 39 is provided with one row of one-third-moon-shaped, symmetrically spaced, semi-radially extending impeller vanes 41 integral therewith and cooperative, during the coaxial rotation of said assemblies 28 and 39, in circulating fluid to within the adjacent row of buckets 33 and 33', in the adjacent half of said coupler casing 28, and wherein each such half 39' and 39'' is further provided with a series of semi-diagonally and radially extending access holes 42, having their outer radius ends terminating intermediate to the adjacent vanes 41, and their inner radius ends initiating in an annular shaped, relatively narrow access space 42' extending radially between such halves 39' and 39'', and wherein such access holes 42 and space 42' are provided for parallel fluid circulation that will be described more in detail hereinafter.

Within the coupler and carried by the planet gear carrier 39, a series of planet-gears 43 are provided and are located intermediately to and mesh with said gear 25 and said orbit gear 29, and each such planet-gear 43 is rotatably journalled upon a series of needle-type roller bearings 43' which latter are journalled on one of the elongated shouldered pins 43", which latter are provided to be a press-fit within both halves of the assembly 39 and wherein one such pin 43" is provided for each gear 43.

Threaded into the half 39', and shouldered and rotatable within the half 39" of said assembly 39, are provided a series of, symmetrically spaced elongated cylindrical cap-screw-pins 44 which are provided for the dual purpose of securing said halves of said assembly 39 together and simultaneously providing a means of rotatably driving a pair of flanged annular shaped clutch shoes 45 described hereinafter.

Intermediate to the halves 39' and 39", encircling the socket-head cap-screw-pins 44, are provided a plurality of locking washers 44' and relatively thin shims 44" respectively for locking each of said screw-pins 44 in place and adjusting the roller bearings 40 on their journals 26. While interposed between the end faces of the assembly 39 and the adjacent end wall thrust faces 34 are provided said pair of clutch shoes 45, each rotatable with said assembly 39 on a journal formed on each hub portion of each half of said assembly 28, and said clutch shoes are rotatively driven by said screw-pins 44, and are each provided with an appreciable initial axial displacement thrust, toward the adjacent thrust face 34 by a series of resilient coil-type springs 46, which latter are symmetrically spaced within their respective clutch shoes and are interposed between the latter and said assembly 39.

Inasmuch as said pair of clutch shoes 45 are identical in size and construction and are symmetrically oppositely located and exert pressure against opposite thrust faces 34 of said casing assembly 28, it is obvious that they will not create any unbalanced axial pressure thrust condition within said casing assembly 28 when fluid pressure is applied internally to the latter. However, due to the relatively large area clutching surface thrust faces 34' of said clutch shoes 45, and to the initial and also the ultimate opposite displacement thrust of such clutch shoes by variable fluid pressure within said casing assembly 28, such pair of clutch shoes 45 are capable, during their simultaneous dual axial displacement within said assembly 28, of considerable dual clutching capacity applicable substantially between said combined impeller and planet-gear carrier assembly 39 and said combined orbit gear carrier and closed fluid receptacle casing assembly 28, and thus forms an efficient, variable, progressive dual-clutching means substantially between said planet-gear carrier assembly 39 and said orbit gear carrier assembly 28. Such dual-clutching means is in addition to and is in parallel with the dual hydrodynamic locking means provided between said assemblies 39 and 28, and thus provides a means in combination by which said hydrodynamic locking means can be progressively varied, remotely to the coupler assembly at the will of the operator, regardless of the direction of rotation of said sun-gear 25 of said coupler assembly.

In order to fluid cool the frictional thrust faces 34 and 34', each of said clutch-shoes 45 is provided with a plurality of symmetrically spaced access ports 45' extending semi-radially and diagonally through the hub portions thereof and connected, at their inner radius ends, with the terminal access groove 47 which latter is also in communication with a series of radially extending, relatively sharp edged, combined fluid circulating and wiper grooves 45" located in the thrust face 34' of such shoe 45, and wherein such ports and grooves are provided both for fluid circulation and for cooling purposes, and in respect to said grooves 45", for reducing the thickness of the fluid film between the thrust faces 34 and 34'.

The dual flow fluid circulation cycle of operations of the coupler consists of; a symmetrical dual forced flow circulation of the fluid within said casing assembly 28 set up by the rotation of the dual vaned combined fluid impeller and planet-gear carrier assembly 39 taking fluid suction at the inner radius ends of said pair of rows, of symmetrically oppositely located, semi-radially extending one-third-moon-shaped vanes 41 of said impeller, and thence discharging such fluid, under centrifugal force, via the periphery of each half 39' and 39" of assembly 39 in two separate parallel flow streams from the outer radius ends of said pair of rows of said vanes 41 and immediately into the adjacent open sides of a pair of rows of said elongated semi-axially and radially extending curved buckets 33 and 33' located in an annular rim portion of said casing assembly 28 on either side of said orbit-gear 29 within the latter; thence axially out of said pair of rows of said buckets 33 and 33', adjacent the wall ends of said casing halves 28' and 28", and radially inward through the oppositely located pair of access passages 48 and back into the suction sides of said pair of rows of vanes 41 of said impeller; and, thus completing one dual fluid circulation flow cycle. However, a relatively small quantity of such fluid is simultaneously circulated, within said casing assembly 28 parallel to the first mentioned flow circuit therein, by fluid being discharged from said pair of rows of said buckets, at the orbit gear end thereof, into the adjacent ends of the internal teeth of said orbit gear 29, and thence radially inward through said passage 42' into the adjacent ends of said series of semi-diagonally and radially extending access holes 42, in each of the halves 39' and 39", and thence semi-radially outward therethrough such access holes 42 and into the halves of said combined impeller and planet-gear carrier assembly 39, thus assisting in such dual flow fluid circulation within such coupler.

Inasmuch as, during the operation and functioning of the coupler assembly, it often becomes necessary to stop and to hold the coupler combined casing 28 and traction wheel assembly, as when the coupler elements are idly rotating as in Fig. 6, by some braking means applicable to such casing assembly 28 and which forms a part thereof the combined coupler and wheel assembly. Such a means is thus provided in the form of a combined manually and hydraulically operatable braking means consisting briefly of; a pair of semi-circular shaped brake-shoe-halves 49 operatable within said brake-drum 37 and which are each pivotally and adjustably mounted at one end thereof, after the conventional manner, upon a cam-bolt 49' secured in said dust cover 15, and are each operatable, at the opposite ends thereof, both mechanically and hydraulically respectively by the cam-shaft 50 and the conventional type of hydraulic brake operating unit 51 both attached to said dust cover 15, and, which parts 50 and 51 are operatable as described hereinafter.

Figure 1:
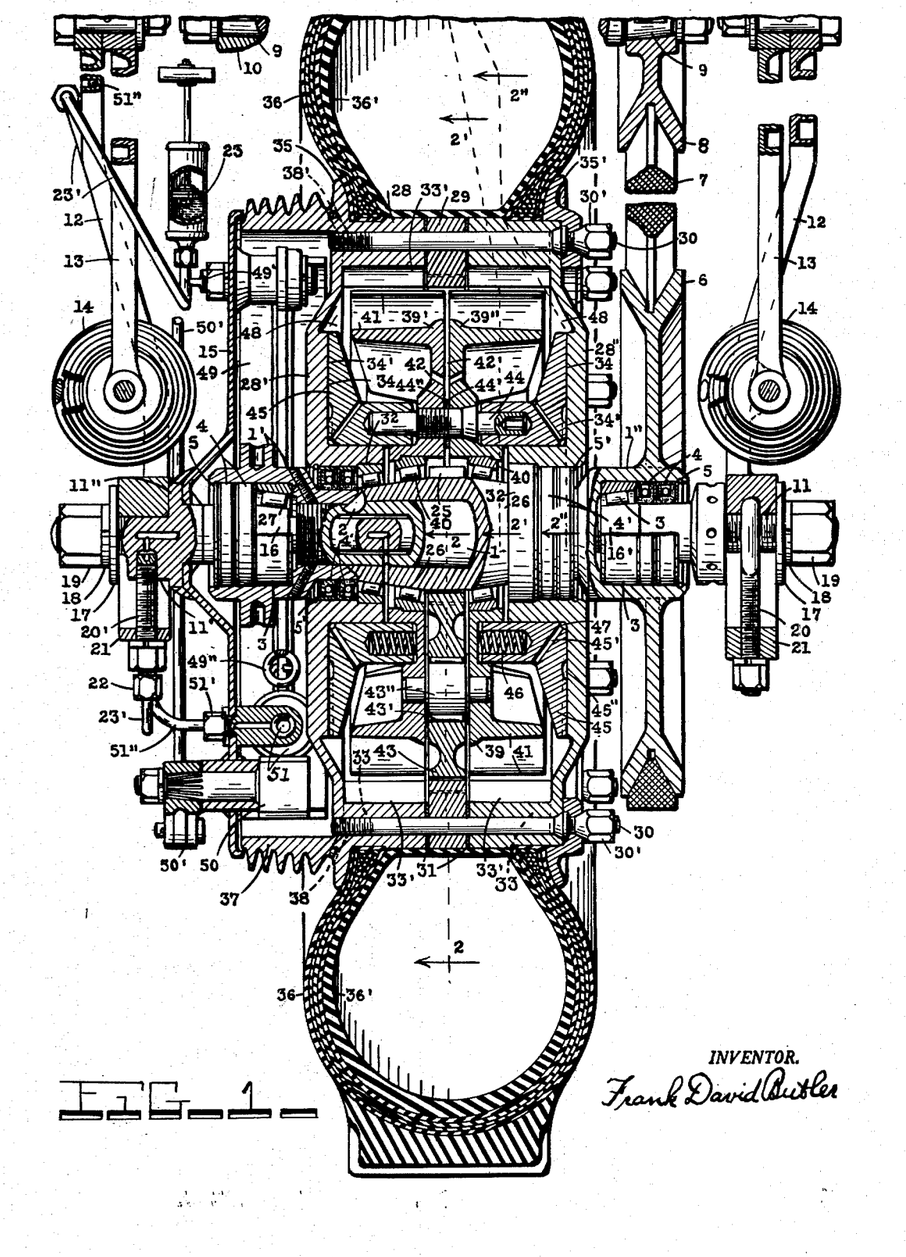
Fig. 1 is an assembly view of the type of coupler described in the foregoing and as applied in combination with a traction wheel of an automotive scooter framing and as it would appear in section on the dotted and broken line 1—1 of Fig. 2 and with some parts illustrated in elevation.

Remotely to the coupler assembly, as illustrated in Fig. 3, and on either side of the motor cycle are provided one of a twin pair of foot operatable pedals 52. Both of these pedals are connected, via similar elongated straddle yokes 54, to a plunger of a conventional type of brake operating master hydraulic cylinder 53; one of which latter is connected via tubing 23', Figs. 3 and 1, to variably supply fluid under pressure internally to casing assembly 28 via fitting 22, in lieu of hand pump 23; while, the other hydraulic cylinder 53 is similarly connected via tubing 51'' (Fig. 1) to the hydraulically operatable braking unit 51. Each of said pedals 52 are pivoted in their respective flanged quadrant 55, of a pair of the latter, which is in turn secured to said main framing 13; and each of said quadrants 55 are provided with a quadrant rack of notches 55' which are provided to receive the free ends of their respective pawls 56, each of which latter is pivoted to its respective pedal 52 and may be used for latching such pedal in its forward, in respect to the vehicle, operating position of arc travel; and wherefrom it can be conveniently released by tilting the pivoted toe-plate 52', of its respective pedal 52, forward at the top and thus lifting said pawl 56 clear of said rack notches 55' by its respective link rod 56' connecting 52' and 56. The straddle yoke 54, extending between whichever pedal 52 and hydraulic brake cylinder 53 that are to be used for applying external braking to said casing assembly 28, is also connected to the pull-rod 50' (Fig. 1) for simultaneously applying mechanical braking through operation of the cam-shaft 51, and wherein both hydraulical and mechanical braking may be thus simultaneously applied to the brake-shoe-halves 49, and which application is resisted by the retraction spring 49'', connecting the halves of 49 together.

The pivoted toe-plates 52' and their respective pawls 56 of the opposite pedals 52, only one illustrated, can be used for retaining such pedals in their depressed state of operation, at the will of the operator, by latching their respective pawls in their quadrant notches 55'.

It should be noted that the application of said variable fluid pressure to said closed casing 28 substantially bolsters the clutching of the hydrodynamical driving member, which is the intermediate member in this coupler, with the hydrodynamically driven member of the coupler in parallel with the hydrodynamical progressive locking means existing between such hydrodynamical driving and hydrodynamically driven members, and thus results in synchronizing the rotative speeds of, and regulates slippage between, such two members. Thus such means can be used at will, during either direction of rotation of the coupler sun-gear, for increasing the coupler gearing ratio, and which latter also would apply to producing a 1 to 1 gearing ratio within the coupler for motive power braking purposes.

It may be pointed out that the essential parts within the coupler are all arranged in dual form symmetrically on either side of the orbit gear 29 so that no unbalanced axial thrust will be produced within the closed casing 28 when the variable fluid pressure is applied thereto.

It is understood that various minor changes may be made in actual practice without digressing from the scope of the claims and the concept of the invention.

Thus having described my invention, I claim:

1. In a combined hydrodynamic and planetary gearing driven type of coupler equipped with, a reversible sun-gear type of driving member, a coaxially rotatable, annular shaped, combined orbit gear carrier and dual-bucketed closed fluid receptacle casing forming a hydrodynamical and gearing driven member having a pair of symmetrically opposite surfaces thereon, and, a coaxially rotatable combined planet-gear carrier and dual-vaned fluid circulating impeller forming an intermediate member of said coupler and having a pair of symmetrically opposite surfaces rotatable therewith; the provision therein of a variable fluid pressure means, applicable within said closed casing, by which a variable dual contact-clutching is produced, simultaneously, between said pair of symmetrically opposite surfaces rotatable with said intermediate member and said pair of symmetrically opposite surfaces rotatable with said driven member of said coupler.

2. Claim 1 characterized by, upon the application of said variable fluid pressure means, within said closed casing while said driving member is rotating, results in a means of dual progressively clutching said intermediate member with said hydrodynamically driven member, in parallel with a dual-hydrodynamical-locking-means existing between such two members, and wherein said means of dual clutching can thus be used to vary the operation of said dual-hydrodynamical locking means.

3. Claim 1 characterized by, said variable dual contact-clutching between said pair of symmetrically opposite surfaces rotatable with said intermediate member and said pair of symmetrically opposite surfaces rotatable with said driven member, comprising; a means of variably, oppositely axially, displacing said pair of symmetrically opposite surfaces rotatable with said intermediate member against said pair of symmetrically opposite surfaces of said driven member and thus, during the rotation of these members, providing a dual variable means of equalizing the rotative speeds of said intermediate and driven members, and wherein, under certain conditions of operation, such clutching results in said driven member rotatively driving said intermediate member.

4. In a combined hydrodynamic and planetary gearing driven type of coupler equipped with, a sun-gear coaxially rotatable with a reversible driving shaft forming the driving member, a coaxially rotatable combined orbit-gear-carrier and closed fluid receptacle casing forming a hydrodynamical and gearing driven member, and, a coaxially rotatable, annular shaped, combined planet-gear carrier and fluid circulating impeller forming an intermediate member of said coupler; the provision therein of means providing said intermediate member with a pair of rows of curved vanes, with one row located at each end of said intermediate member, and wherein during one direction of rotation of the latter, act in the capacity of fluid impeller vanes, while in the other direction of rotation, act in the capacity of fluid induction scoops and wherein such pair of rows of combined impeller vanes and induction scoops form a means of dual fluid circulation within said coupler in either direction of rotation of said shaft and sun-gear; means providing said driven member with a pair of rows of curved buckets with each row of said buckets extending, tangentially to the existing axis of rotation, adjacent to one row of said curved vanes and wherein said buckets are co-operative with the latter; a pair of flanged clutch shoes with one located adjacent to each end of and rotatively driven by said intermediate member and each oppositely movable against adjacent clutching surfaces of said driven member, thereby forming a dual-braking means in conjunction with the latter; means in the form of a series of resilient springs for providing each clutch shoe with an initial axial thrust against said adjacent clutching surfaces; and a variable fluid pressure means applicable within said coupler by which said pair of clutch shoes can be simultaneously displaced and thus to provide dual-clutching between said intermediate and driven members.

5. Claim 4 characterized, in that said dual clutching means, formed between said intermediate and driven members of said coupler, form a dual-clutching progressive locking means which is in parallel with the dual-hydrodynamic progressive locking means existing between these two members and results in the latter locking means being made variable, at will and during either direction of rotation of said shaft and sun-gear, by the application of said variable fluid pressure means to said dual clutching means within said coupler.

6. In a combined hydrodynamic and planetary gearing driven type of coupler equipped with a sun-gear coaxially rotatable with a reversible driving shaft forming the driving member, a coaxially rotatable combined orbit-gear carrier and closed fluid receptacle casing forming a hydrodynamical and gearing driven member, and, a coaxially rotatable, annular shaped, combined planet-gear carrier and fluid circulating impeller forming an intermediate member of said coupler; the provision therein of means of providing said intermediate member with symmetrically oppositely located dual parallel rows of fluid circulating vanes; means of providing said driven member with dual parallel rows of buckets with one row adjacent to each row of said vanes, and thus, in conjunction with the latter, forming a progressive dual-hydrodynamical-locking means between such carrier members; means in the form of a pair of, opposite axially movable, flanged clutch-shoes with one located adjacent each end of said intermediate member and coaxially driven thereby and therewith the latter; multiple spring means providing said pair of clutch-shoes with respective initial axial thrust against adjacent parallel surfaces which latter are rotatable with said driven member; a variable fluid pressure means, applicable within said closed casing, by which said clutch-shoes are each simultaneously variably movable against said driven member; and, means forming a variable dual-clutch locking means between said intermediate and driven members in parallel with said progressive dual-hydrodynamical-locking means provided therebetween.

7. Claim 6 characterized by, said means forming a variable dual-clutch locking means, between said intermediate and driven members in parallel with said progressive dual-hydrodynamical-locking means, thereby forming a means whereby the latter can be made variable, at will and during either direction of rotation of said driving shaft and sun-gear, by the application of said variable fluid pressure means to said dual clutch locking-means within said coupler.

8. Means of applying a combined dual-hydrodynamical, and planetary gearing driven coupler, provided with a sun-gear rotatable with a reversible shaft, with a dual-clutching means operative progressively at will between the usual planet-gear carrier and the usual orbit-gear carrier of such type of coupler, as a combination formed within the hub proper of a traction wheel.

9. In a combined hydrodynamical and planetary gearing driven, internal fluid pressure variable coupler equipped with a sun-gear rotatable with an elongated shaft extending beyond and forming a reversible driving member thereof such coupler, a coaxially rotatable combined orbit gear carrier and dual-bucketed closed fluid receptacle casing forming the gearing and hydrodynamically driven member and provided with a pair of symmetrically opposite parallel surfaces, and, a coaxially rotatable combined planet-gear carrier and dual-vaned fluid circulating impeller forming an intermediate member thereof said coupler and provided with a pair of symmetrically opposite clutch-shoes rotatable therewith, and wherein said driven member forms the hub portion proper of a traction wheel; the provision therein of a cylindrical stator member, extending into said closed casing concentric with the axis of rotation of said sun-gear and upon which the latter is rotatively supported; means via which fluid under a variable pressure is introduced into said closed casing, via said stator, as a means for simultaneously oppositely axially displacing said pair of clutch-shoes against said symmetrically opposite parallel surfaces, of said driven member and thereby producing a variable dual clutch-locking means between said intermediate and driven members; and, which latter means is operative in parallel with a dual hydrodynamical-locking-means existing respectively between such dual-vaned and dual-bucketed members, and thus resulting in a means of varying the synchronization of the rotation of such two members by the variable parallel application of said dual clutch-locking-means therebetween during either direction of rotation of said sun-gear.

10. In a combined hydrodynamical and planetary gearing driven type of coupler; the provision therein of a stator member extending throughout said coupler and adjustable within a forked flexibly supported framing; a tapering tubular shaft rotatively journalled upon said stator and supporting said coupler; a combined sun-gear and opposed dual tandem coned journal member which is coaxially rotatable with and driven by said tubular shaft; a halved type of, annular shaped, combined planet-gear carrier and dual-vaned fluid circulating impeller, coaxially rotatable astride of and rotatively journalled upon said combined sun-gear and dual coned journal, and forming the intermediate member and dual hydrodynamic driving member of such coupler; a halved type of combined orbit-gear carrier and dual bucketed closed fluid receptacle casing, coaxially rotatable astride of said intermediate member and rotatively journalled upon said combined sun-gear and dual coned journal, and forming the gearing and hydrodynamically driven member of said coupler; an internally toothed orbit-gear secured between the halves of said driven member and rotatively carried thereby; a series of planet-gears symmetrically spaced about the axis of said intermediate member and rotatively carried thereby and rotatable between the halves thereof while meshing with both said sun-gear and said orbit-gear; a pair of opposed, flanged, annular shaped clutch-shoes, one interposed between each end of said annular shaped intermediate member and an adjacent interior end wall of said closed casing driven member, and each journalled upon adjacent hub portions of the latter and of said intermediate member, and both coaxially rotative with and driven by the latter; means in the form of a series of symmetrically spaced coil springs interposed between the ends of said intermediate member and the adjacent clutch-shoes and each located within a recess within one of the latter, and wherein such coil springs are provided for initially axially displacing said clutch-shoes against the adjacent side-walls of said driven member; a series of cap-screw-pins symmetrically spaced in and extending through and beyond said intermediate member and providing a means of rotatively driving said pair of clutch-shoes; and, means of applying fluid under a variable pressure, from a remote source, internally to said closed casing via said stator member and wherewith to variably increase said initial axial thrust of said clutch-shoes, driven by said intermediate member, against said driven member.

11. In a closed type of combined hydrodynamical and planetary gearing driven rotative coupler; the provision therein of a variable fluid pressure means applicable internally to said coupler via a stator member extending therewithin and rotatively supporting said coupler, a pair of symmetrically oppositely located clutch-shoes, rotative with and driven by a combined planet gear carrier and dual vaned fluid circulating impeller which latter forms the hydrodynamical driving member thereof such coupler; a coaxially rotatable combined orbit-gear carrier and dual bucketed closed fluid receptacle casing forming the gearing and hydrodynamically driven member thereof such coupler.

12. In a closed type of combined hydrodynamical and planetary gearing driven rotative coupler forming the hub proper of a traction wheel; the provision therein of an elongated stator member extending concentrically therewithin and rotatively supporting said coupler; a pair of symmetrically oppositely located clutch-shoes, rotative with and driven by a combined planet-gear carrier and dual vaned fluid circulating impeller which latter forms the hydrodynamical driving member thereof such coupler; a combined orbit-gear carrier and dual bucketed closed fluid receptacle casing, forming the gearing and hydrodynamically driven member thereof such coupler; and, means for variably clutching said shoes oppositely axially against said driven member and wherein such variable clutching substantially between said hydrodynamical driving and hydrodynamically driven members is in parallel with the hydrodynamical means existing between such two members, and whereby this variable clutching results in said hydrodynamical means being thus made variable by said fluid pressure means.

13. Claim 10 characterised by, said driven member forms the hub portion proper of a traction wheel assembly which latter is rotatively supported upon said stator member adjustable within said forked framing.

14. In a closed type of coaxially rotatable hydrodynamically driven rotative coupler equipped with a hydrodynamical driving member and a hydrodynamically driven member; the provision therein of a pair of symmetrically oppositely located clutch-shoes rotative with said driving member; and, a variable fluid pressure means applicable internally to said closed coupler, wherewith said clutch-shoes are variably displaced axially in opposite directions one to the other and are clutched against said hydrodynamically driven member in parallel with the hydrodynamical means existing between such hydrodynamical driving and hydrodynamically driven members of such coupler.

15. In a combined hydrodynamical and planetary gearing driven type of coupler applied as the hub proper of a traction wheel and equipped with a hydrodynamical driving member and a coaxially rotatable hydrodynamically driven member; the provision therein of a sun-gear, mounted to rotate with a driving shaft of said coupler; a pair of tandem roller bearing journal cones formed integral with said sun-gear with one tandem cone located on each side of said sun-gear proper; and, wherein said journal cones are provided to rotatively support said hydrodynamical driving, and said hydrodynamically driven members of said coupler.

16. In a closed type of combined hydrodynamical and planetary gearing driven coupler; the provision therein of a sun-gear, mounted to rotate coaxially with a driving shaft of said coupler, integral with a tandem pair of dual roller bearing journal cones formed with one tandem cone located on each side of said sun-gear proper; a combined planet-gear carrier and dual-vaned fluid circulating impeller forming the hydrodynamical driving member of said coupler and which is provided to straddle said sun-gear and to be rotatively journalled on one pair of said cone journals; a combined orbit-gear carrier and dual bucketed closed fluid receptacle casing forming the gearing and hydrodynamically driven member of said coupler and which is provided to straddle said driving member and to be rotatively journalled on the other pair of said cone journals; a pair of clutch-shoes, rotatively driven by said driving member, wherein one is interposed between the latter and said driven member on either side of said sun-gear; and, a variable means applicable internally to said coupler by which said pair of clutch-shoes are simultaneously oppositely axially displaced against said driven member and variably clutch locks said hydrodynamical driving and hydrodynamically driven members together in parallel with the hydrodynamical locking means existing between the last mentioned members.

17. Claim 16 characterized by, said driven member is of a halved type wherein the orbit-gear carried by it is secured between such halves adjacent to a rim periphery of such driven member.

18. Claim 16 characterized by, said hydrodynamical driving member being of a halved type wherein a series of symmetrically spaced planet-gears carried by it are rotatable between and are journalled within such halves, and wherein such planet-gears mesh with said sun-gear, and also with the orbit-gear carried by said orbit-gear carrier driven member.

19. Claim 16 characterized by, the variable clutch-locking of said hydrodynamical driving and hydrodynamically driven members together, operating in parallel with the hydrodynamical-locking-means existing between this hydrodynamical driving and this hydrodynamically driven member, thus providing a means by which the latter locking-means may be varied by said variable means applicable to within said coupler.

20. In a closed type of hydrodynamically driven rotative coupler equipped with a hydrodynamical driving member and a coaxially rotatable hydrodynamically driven member; the provision therein of a variable fluid pressure means, applicable manually by an operator, to within said driven member; a pair of clutch-shoes rotatable with and driven by said driving member and which shoes are oppositely axially displaced within said driven member and clutched, by said fluid pressure means, against an adjacent pair of clutching surfaces, rotatable with said driven member, in parallel with the hydrodynamical driving means existing between said hydrodynamical driving and hydrodynamically driven members and whereby said hydrodynamical driving means is thereby made variable by the application of said variable fluid pressure means.

21. A combined hydrodynamical and planetary gearing driven transmission coupler, comprising in combination: a reversible shaft mounted sun-gear integral with a pair of roller bearing cone journals formed on either side thereof and wherein such sun-gear forms the driving member of such coupler; a halved type of coaxially rotatable dual row vaned combined fluid circulating impeller and planet-gear-carrier forming the hydrodynamical driving and intermediate member; a halved type of coaxially rotatable dual row bucketed combined orbit-gear-carrier and closed fluid receptacle casing forming the gearing and hydrodynamically driven member; an elongated cylindrical stator member provided to extend concentrically axially throughout the coupler and upon which the reversible shaft of tubular form is journalled; a pair of flanged annular shaped clutching shoes with one provided to be interposed between adjacent ends of said intermediate and driven members, and wherein each clutching shoe is provided to be rotatively driven by such intermediate member and to be provided with an initial axial clutching thrust against said driven member in parallel with the coupler progressively operative dual hydrodynamical means provided between such intermediate and driven members; a variable fluid pressure means applicable to within said driven member via said stator member and provided for bolstering the clutching of such clutch-shoes against said driven member, and resulting in equalizing the speeds of rotation of said intermediate and driven members in parallel with said progressively operative hydrodynamical means accomplishing a similar purpose; a combined mechanically and hydraulically operative braking means provided with a brake-drum forming a part of said driven member, and which braking means is employed in braking the latter in either direction of its rotation; means for sealing the rotative members of the coupler against fluid leakage along rotative surfaces to external to said coupler; means for securing the orbit gear of said planetary gearing intermediate to the halves of said driven member; and, means for enclosing said sun-gear, intermediate member and pair of clutching shoes internally to said driven member with the latter forming the hub proper of a traction wheel of an automotive vehicle.

References Cited in the file of this patent

UNITED STATES PATENTS

| Number | Name | Date |
|---|---|---|
| 971,166 | Bingham | Sept. 27, 1910 |
| 1,430,676 | Osborn | Oct. 3, 1922 |
| 2,166,961 | Marsh | July 25, 1939 |
| 2,287,498 | Scofield | June 23, 1942 |
| 2,301,242 | Krick | Nov. 10, 1942 |
| 2,335,549 | Schnetzer | Nov. 30, 1943 |
| 2,380,734 | Eastin | July 31, 1945 |
| 2,544,551 | Block | Mar. 6, 1951 |

FOREIGN PATENTS

| Number | Country | Date |
|---|---|---|
| 479,119 | Germany | July 9, 1929 |